US00RE37019E

(19) United States
(12) Reissued Patent
Elson

(10) Patent Number: US RE37,019 E
(45) Date of Reissued Patent: Jan. 16, 2001

(54) REFRIGERATION COMPRESSOR

(75) Inventor: John P. Elson, Sidney, OH (US)

(73) Assignee: Copeland Corporation, Sidney, OH (US)

(21) Appl. No.: 07/996,382

(22) Filed: Dec. 23, 1992

Related U.S. Patent Documents

Reissue of:
(64) Patent No.: 4,895,496
Issued: Jan. 23, 1990
Appl. No.: 07/204,091
Filed: Jun. 8, 1988

U.S. Applications:
(63) Continuation of application No. 07/824,069, filed on Jan. 23, 1992, now Pat. No. Re. 34,297.

(51) Int. Cl.[7] ..... F04B 39/02
(52) U.S. Cl. ..... 417/372; 417/410; 417/902; 310/88
(58) Field of Search ..... 417/372, 410, 417/902; 310/86, 87, 88

(56) References Cited

U.S. PATENT DOCUMENTS

| | | |
|---|---|---|
| Re. 33,652 | 7/1991 | Yamamura et al. . |
| 1,614,676 | 1/1927 | Kercher . |
| 1,797,287 | 3/1931 | Kucher . |
| 1,964,415 | 6/1934 | Van Deventer . |
| 2,062,052 | 11/1936 | Horlacher . |
| 2,066,177 | 12/1936 | Johnson . |
| 2,069,767 | 2/1937 | McCormack . |
| 2,178,811 | 11/1939 | Sateren . |
| 2,287,203 | 6/1942 | Smith . |
| 2,683,233 | 7/1954 | Ruhl . |
| 2,883,101 | 4/1959 | Kosfeld . |
| 2,905,510 | 9/1959 | Gardiner . |
| 3,147,914 | 9/1964 | Hatten et al. . |
| 3,176,914 | 4/1965 | Rinehart . |
| 3,434,656 | 3/1969 | Bellmer . |
| 3,480,205 | 11/1969 | Hatten . |
| 3,544,820 | 12/1970 | Wightman . |
| 3,560,116 | 2/1971 | Valbjorn et al. . |
| 3,565,553 | 2/1971 | Rinehart et al. . |
| 3,614,384 | 10/1971 | Heitchue, Sr. . |

(List continued on next page.)

FOREIGN PATENT DOCUMENTS

| | | |
|---|---|---|
| 2154664A | 9/1985 | (GB) . |
| 2159884A | 12/1985 | (GB) . |
| 54-139107 | 10/1979 | (JP) . |
| 57-69985 | 4/1982 | (JP) . |
| 57-102594 | 6/1982 | (JP) . |
| 58-101274 | 6/1983 | (JP) . |
| 58-104386 | 6/1983 | (JP) . |
| 59-97278 | 7/1984 | (JP) . |
| 59-141784 | 8/1984 | (JP) . |
| 59-141785 | 8/1984 | (JP) . |
| 59-160089 | 9/1984 | (JP) . |
| 59-224493 | 12/1984 | (JP) . |
| 60-30494 | 2/1985 | (JP) . |
| 60-66890 | 5/1985 | (JP) . |
| 60-88095 | 6/1985 | (JP) . |
| 60-29837 | 7/1985 | (JP) . |
| 60-166778 | 8/1985 | (JP) . |
| 60-166784 | 8/1985 | (JP) . |
| 60-206989 | 10/1985 | (JP) . |

(List continued on next page.)

*Primary Examiner*—Charles G. Freay
(74) *Attorney, Agent, or Firm*—Harness, Dickey & Pierce, P.L.C.

(57) ABSTRACT

A refrigeration motor compressor assembly has a housing including a lubricant sump in the bottom thereof into which the lower end of the drive shaft and associated rotor extend. A shield is provided which is positioned by the drive shaft and extends above the oil level in the sump in surrounding spaced relationship to the lower end of the rotor. As the rotor rotates within the shield, lubricant contained therein is thrown out of the surrounding shield and a close fit between the shield and the shaft restricts return flow of lubricant into the area occupied by the rotating rotor.

22 Claims, 2 Drawing Sheets

U.S. PATENT DOCUMENTS

| | | | | |
|---|---|---|---|---|
| 3,618,337 | | 11/1971 | Mount . | |
| 3,653,248 | | 4/1972 | Leffers . | |
| 3,664,461 | | 5/1972 | Leffers et al. . | |
| 3,664,771 | | 5/1972 | Suzuki et al. . | |
| 3,836,290 | | 9/1974 | Carter . | |
| 4,127,994 | | 12/1978 | Niven . | |
| 4,271,368 | | 6/1981 | Burns . | |
| 4,325,679 | | 4/1982 | Smith . | |
| 4,445,056 | | 4/1984 | Gaylord . | |
| 4,517,479 | | 5/1985 | Aleem et al. . | |
| 4,545,743 | | 10/1985 | Earley . | |
| 4,564,339 | * | 1/1986 | Nakamura et al. | 417/366 X |
| 4,565,503 | | 1/1986 | Wise . | |
| 4,569,639 | | 2/1986 | Hannibal et al. . | |
| 4,609,334 | | 9/1986 | Muir et al. . | |
| 4,621,993 | | 11/1986 | Nakamura et al. . | |
| 4,637,786 | | 1/1987 | Matoba et al. . | |
| 4,666,381 | | 5/1987 | Butterworth . | |
| 4,702,683 | | 10/1987 | Inaba et al. . | |
| 4,717,316 | | 1/1988 | Muramatsu et al. . | |
| 4,730,988 | | 3/1988 | Ma . | |
| 4,755,114 | | 7/1988 | Shibayashi et al. . | |
| 4,781,542 | | 11/1988 | Ozu et al. . | |
| 4,895,496 | * | 1/1990 | Elson | 417/372 |
| 4,998,864 | * | 3/1991 | Muir | 417/902 |
| 5,064,356 | * | 11/1991 | Horn | 417/410 D |

FOREIGN PATENT DOCUMENTS

| | | |
|---|---|---|
| 60-237182 | 11/1985 | (JP) . |
| 60-252186 | 12/1985 | (JP) . |
| 61-65084 | 4/1986 | (JP) . |
| 61-79873 | 4/1986 | (JP) . |
| 61-82076 | 5/1986 | (JP) . |
| 61-118589 | 6/1986 | (JP) . |
| 62-16776 | 1/1987 | (JP) . |
| 62-38884 | 2/1987 | (JP) . |
| 62-168976 | 7/1987 | (JP) . |
| 62-178790 | 8/1987 | (JP) . |
| 62-143081 | 9/1987 | (JP) . |
| 63-141889 | 9/1988 | (JP) . |

* cited by examiner 28
24
10
30
32
26
20
16
22
14
38
44
46
40
42
36
52
54
12
48
34
56
62
50
51
2
2

REFRIGERATION COMPRESSOR

Matter enclosed in heavy brackets [ ] appears in the original patent but forms no part of this reissue specification; matter printed in italics indicates the additions made by reissue.

*This application is a continuation of U.S. patent application Ser. No. 07/824,069 filed Jan. 23, 1992, now Reissue Pat. No. RE. 34,297 which is a reissue of U.S. Pat. No. 4,895,496, issued Jan. 23, 1990.*

BACKGROUND AND SUMMARY OF THE INVENTION

The present invention relates generally to refrigeration compressors and more specifically to such compressors incorporating shields for reducing the lubricating oil level in the area surrounding the rotating rotor.

Typical refrigeration compressors incorporate a lubricant sump in the lower or bottom portion of the housing into which the drive shaft extends so as to pump lubricant therefrom to the various portions requiring lubrication. In addition, the lubricant also often acts to aid in removal of heat from the various components. In order to insure sufficient lubricating oil is contained within the sump to assure adequate lubrication and/or cooling of the moving parts while also minimizing the overall height of the housing, it is sometimes necessary that the oil level extend above the rotating lower end of the rotor. However, the higher viscosity of the oil as compared to refrigerant gas creates an increased drag on rotation of the rotor resulting in increased power consumption. This problem is further aggravated in scroll type compressors which typically employ a counterweight secured to the lower end of the rotor.

The present invention, however, provides a shield which projects above the oil level in the sump and is positioned in surrounding relationship to the lower end of the rotor via a close fit with the drive shaft whereby the oil level in the area within the shield is reduced by the initial rotation of the rotor upon startup and return oil flow into this area is greatly restricted. Thus, the oil induced drag on the rotor and resulting increased power consumption of the motor is greatly reduced. In one embodiment, a rotation inhibiting projection is provided on the shield while in another embodiment the shield is allowed to rotate with the drive shaft although the speed of rotation thereof will be substantially less than that of the drive shaft due to the drag exerted thereon by the lubricant. In both embodiments, however, the power consumption of the motor is greatly reduced thus resulting in significant improvement in the operating efficiency of the compressor.

Additional advantages and features of the present invention will become apparent from the subsequent description and the appended claims taken in conjunction with the accompanying drawings.

DESCRIPTION OF THE PREFERRED EMBODIMENTS

Figure 1:
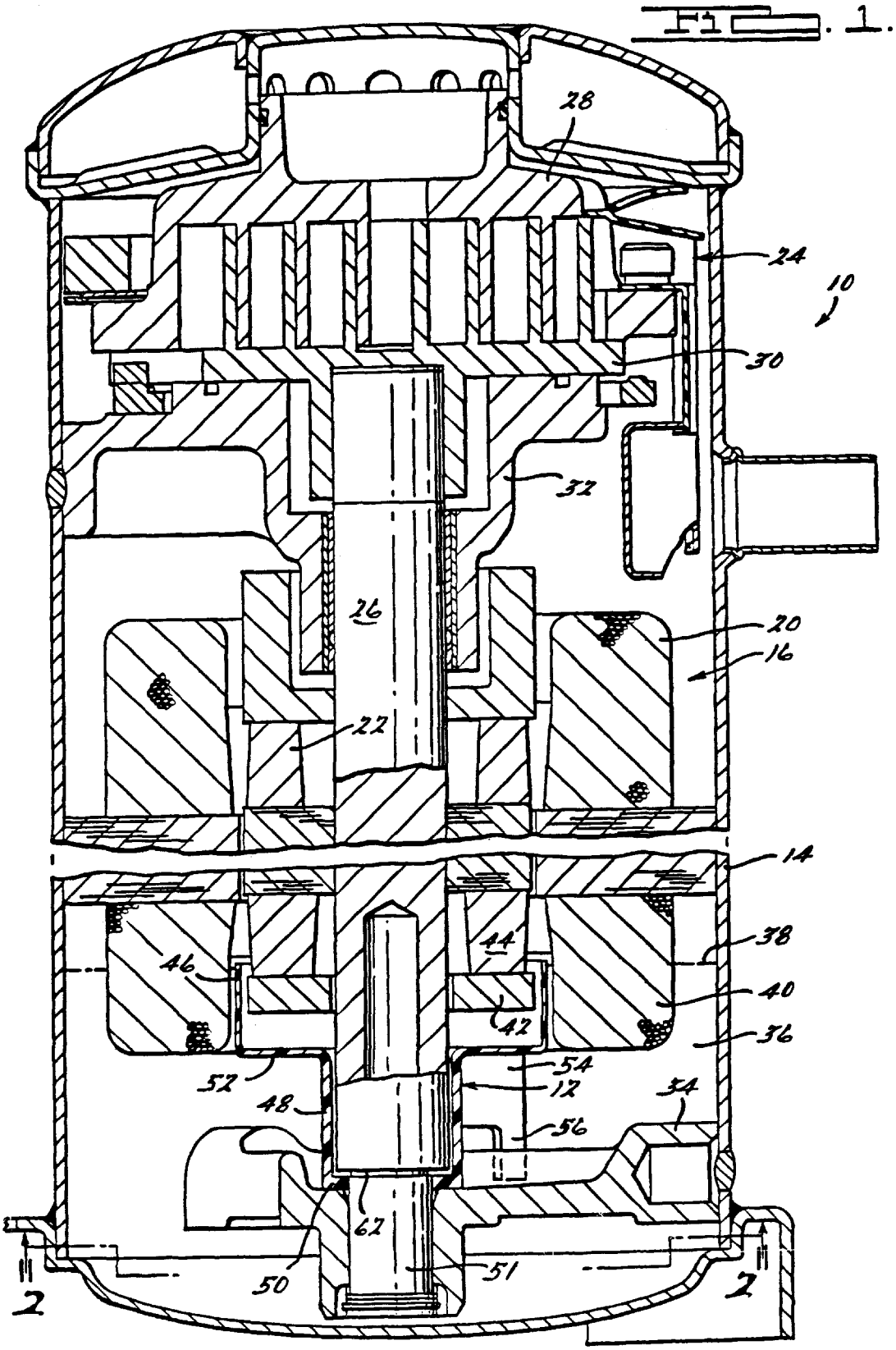
FIG. 1 is a section view of a refrigeration compressor of the scroll type incorporating a shield surrounding the lower end of the motor rotor in accordance with the present invention, the section being taken along a radial plane extending along the axis of rotation of the drive shaft.
Figure 2:
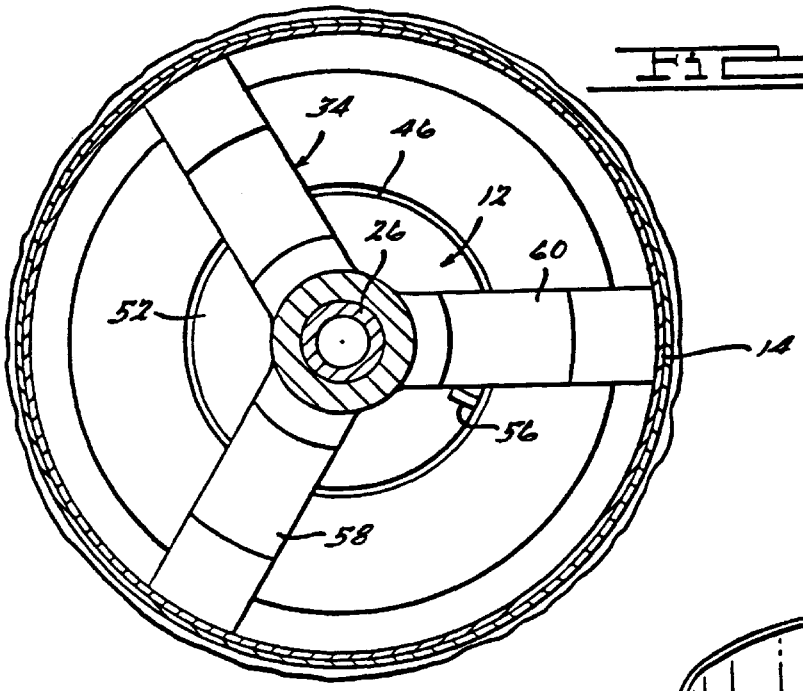
FIG. 2 is a section view of the compressor of FIG. 1, the section being taken along line 2—2 thereof.

Referring now to the drawings and more specifically to FIG. 1, there is shown a hermetic refrigeration compressor 10 incorporating a shield 12 all in accordance with the present invention.

Compressor 10 comprises an outer shell or housing 14 within the lower portion of which is disposed an electric motor 16 including a stator 20 and a rotor 22. Motor 16 is operative to drive a compressor assembly 24 disposed in the upper portion of shell 14 via a drive shaft 26 extending therebetween and to which rotor 22 is secured adjacent the lower end. As shown, compressor assembly 24 is of the scroll type and incorporates an upper fixed scroll member 28 and a lower scroll member 30 which is driven by drive shaft 26 in orbiting motion relative to the fixed scroll member 28. Drive shaft 26 is rotatably supported within shell 14 by means of upper and lower bearing assemblies 32 and 34 respectively each of which are fixedly secured to shell 14. Compressor 10 is described in greater detail in presently pending application Ser. No. 899,003 filed Aug. 22, 1986 entitled "Scroll Type Machine With Axially Compliant Mounting" assigned to the same assignee as the present application, the disclosure of which is hereby incorporated by reference.

The lower portion of shell 14 defines a lubricant sump 36 containing a supply of oil for lubrication of the various components of compressor 10 as well as augmenting cooling thereof. In order to both minimize the overall height of compressor 10 as well as to assure an adequate supply of lubricant is contained within the sump, oil level 38 extends above the lower ends of the end turns 40 of stator 20 and both a counterweight 42 and the lower end portion 44 of rotor 22 to which counterweight 42 is secured.

Shield 12 is preferably formed as a one piece structure from a suitable polymeric composition such as a nylon material for example. It should be noted that other materials may be utilized so long as they are able to resist degradation from both the oil and refrigerant utilized in the system as well as the heat generated during operation of compressor 10. It should also be noted that the use of a dielectric non-magnetic material is believed preferable due to the proximity of the shield to the motor rotor and stator and the desire to avoid any interference with the operation thereof.

Figure 3:
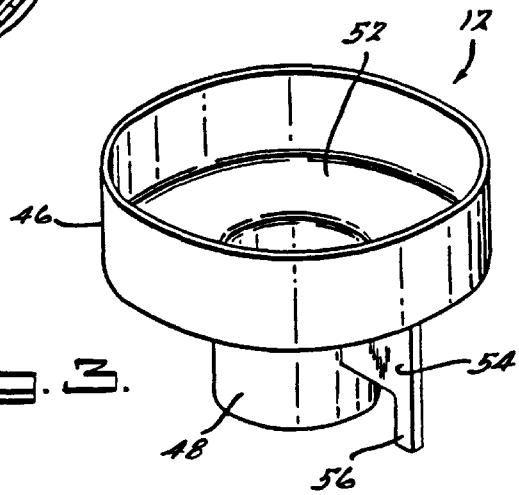
FIG. 3 is a perspective view of the shield shown in FIGS. 1 and 2.

As best seen with reference to FIGS. 1 and 3, shield 12 incorporates a first generally cylindrically shaped portion 46 open at the upper end thereof and positioned in surrounding relationship to lower end portion 44 of rotor 22 and associated counterweight 42. Cylindrical portion 46 extends axially upwardly between rotor 22 and the end turns 40 of stator 20 to a height just slightly above maximum normal oil level 38. A lower hollow generally cylindrically shaped portion 48 extends axially downwardly therefrom in relatively closely spaced relationship to shaft 26 and includes an annular radially inwardly extending flange portion 50 which is received within a reduced diameter portion 51 of shaft 26. A radially extending annular flange portion 52 extends between and interconnects cylindrical portions 46 and 48. In order to restrict rotation of shield 12, a generally flat flange portion 54 is integrally formed on shield 12 extending axially downwardly from the lower surface of flange portion 52 and generally radially outwardly from cylindrical portion 48. Leg 56 extends axially downwardly from flange portion 54 and is received between a pair of support legs 58, 60 forming a part of lower bearing assembly 34 and cooperates therewith to restrict rotational movement of shield 12.

In operation, the rotational movement of the lower end portion 44 of rotor 22 and the associated counterweight 42 will operate to throw oil which has accumulated within the hollow shield 12 radially outwardly and over the top edge of shield 12 through the open spaces in the stator end turns as well as between shield 12 and these end turns and into sump 36 thereby lowering the oil level in the area surrounding the rotating rotor. Because the lower cylindrical portion 48 of shield 12 is closely fitted to the shaft 26, only a very small amount of oil will flow upwardly therebetween. Further, once a substantial amount of the oil within shield 12 has been expelled, shield 12 will become buoyant and float upwardly in the oil sump. As this occurs, flange portion 50 will move into engagement with the annular shoulder 62 on crankshaft 26 thus limiting further axial movement so as to thereby prevent shield 12 from moving upwardly into engagement with the spinning rotor 22. This engagement will also operate to establish a further restriction or seal against oil flow into the interior of shield 12. Thus, shield 12 will operate to effectively reduce the drag on rotor rotation due to its partial immersion into the oil in the lubricant sump and thereby eliminate the resulting power consumption. In this regard, it should be noted that the clearance between cylindrical portion 48 and shaft 26 is sufficient to avoid any excessive wear or drag on shield 12 but yet small enough to enable shaft 26 to effectively maintain shield 12 and particularly upper cylindrical portion 46 thereof the desired substantially coaxial position with respect to rotor 22 so as to avoid the possibility of contact therebetween. When compressor 10 is de-energized, shield 12 will slowly settle axially downwardly as lubricating oil gradually flows back into the interior thereof until such time as it comes to rest on lower bearing assembly 34 as shown in FIG. 1.

Figure 4:
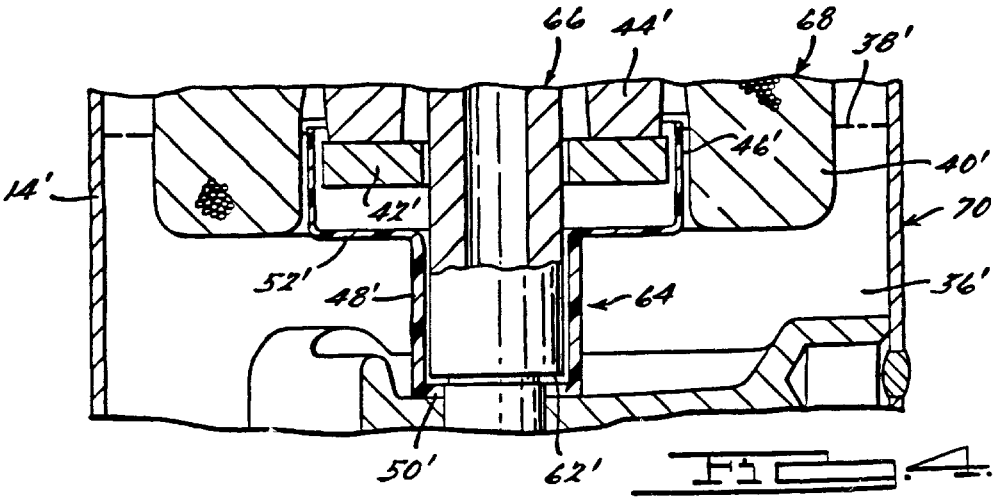
FIG. 4 is a fragmentary section view similar to FIG. 1 but showing only a portion of the oil sump and an alternative embodiment of the shield, all in accordance with the present invention.

Referring now to FIG. 4, a modified embodiment of a shield 64 in accordance with the present invention is shown in operative relationship to a motor assembly 66 and associated drive shaft 68 of a refrigeration compressor 70. Shield 64 is virtually identical to shield 12 with the exception that flange portion 54 and associated leg 56 have been deleted therefrom. Accordingly, corresponding portions of shield 64 have been indicated by like numbers primed. Because shield 64 does not incorporate any means to prevent relative rotation thereof, the viscous drag resulting from the oil disposed between cylindrical portion 48' and shaft 66 will result in rotational movement thereof. However, this rotation will be substantially slower than the speed of rotation of drive shaft 66 because of the viscous drag exerted on shield 64 by the oil within sump 36'. Hence, it is believed only a slight stirring of the oil within sump 36' will occur as shield 64 is allowed to rotate which stirring may be beneficial to aid in cooling of the lower end turns of stator 20'.

Thus, as may now be appreciated, substantial improvements in operating efficiency are achieved by incorporation of either shield 12 or 64 due to the reduced motor power consumption. These longlasting benefits are achieved at a relatively low cost as shields 12 and 64 may be easily and inexpensively formed in any suitable manner such as injection molding or the like and further enable the overall height of the motor compressor to be kept to a minimum.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

[1. A refrigeration compressor comprising:

an outer shell;

a sump disposed in the bottom of said shell containing a supply of lubricant;

a compressor within said shell;

a motor disposed within said shell for driving said compressor, said motor including a stator and a rotor secured to a shaft drivingly connected to said compressor, the lower end of said rotor being rotatable and extending below the normal upper non-operating level of said lubricant in said sump, said shaft extending downwardly from the lower end of said rotor; and shield means extending above said normal upper level of lubricant, said shield means including a first portion extending between said rotor and stator and surrounding said lower portion of said rotor and a second portion operative to position said first portion, said shield means being operative to restrict oil flow to the rotating lower end of said rotor whereby power consumption of said motor is reduced.]

[2. A refrigeration compressor as set forth in claim 1 wherein said second portion cooperates with said shaft to position said first portion.]

[3. A refrigeration compressor as set forth in claim 2 wherein said second portion includes means limiting axial movement of said shield.]

[4. A refrigeration compressor as set forth in claim 2 wherein said second portion operates to maintain said first portion in spaced relationship to said rotor.]

[5. A refrigeration compressor as set forth in claim 4 wherein said second portion also positions said first portion in spaced relationship to said stator.]

[6. A refrigeration compressor as set forth in claim 2 wherein said second portion is positioned in closely spaced relationship with said shaft and cooperates therewith to position said first portion.]

[7. A refrigeration compressor as set forth in claim 6 wherein said second portion includes flange means cooperating with means on said shaft to limit axial movement of said shield.]

[8. A refrigeration compressor as set forth in claim 2 wherein said shield is formed from a dielectric material.]

[9. A refrigeration compressor as set forth in claim 1 wherein said shield further includes means for restricting rotational movement thereof.]

[10. A refrigeration compressor as set forth in claim 9 further comprising lower bearing means for rotatably supporting said shaft and wherein said rotation restricting means comprise a flange portion cooperating with said lower bearing means.]

[11. A refrigeration compressor as set forth in claim 10 wherein said shield is supported by said lower bearing means when said compressor is not operating and by said lubricant when said compressor is operating.]

[12. A refrigeration compressor as set forth in claim 1 wherein said lower end of said rotor includes counterweight means associated therewith.]

[13. A refrigeration compressor as set forth in claim 12 wherein said counterweight means are secured to said rotor.]

[14. A scroll type refrigeration compressor comprising:

an outer shell;

compressor means disposed in an upper portion of said shell, said compressor means including first and second interleaved scroll members supported for relative orbital movement therebetween so as to define moving fluid pockets of changing volume;

motor means disposed within said shell below said compressor means and including a stator and a rotor;

a lubricant sump containing a supply of lubricant disposed in the lower portion of said shell;

a drive shaft drivingly connected to said compressor means and having a lower end extending into said sump, said rotor being secured to said drive shaft and operative to rotatably drive same, said rotor having a lower end portion extending below the normal non-operating upper level of said lubricant; and hollow shield means enclosing an area surrounding said lower end portion of said rotor and extending above the normal upper level of said lubricant, said rotor being operative to expel lubricant from said area enclosed by said shield during rotation thereof and said shield being operative to restrict return flow of oil into said area whereby power consumption of said motor is reduced.]

[15. A refrigeration compressor as set forth in claim 14 wherein said shield is positioned by said shaft.]

[16. A refrigeration compressor as set forth in claim 15 wherein said shield includes a first portion extending between said rotor and said stator and a second portion cooperating with said shaft to position said first portion.]

[17. A refrigeration compressor as set forth in claim 16 wherein said first portion is positioned in spaced relationship to said rotor.]

[18. A refrigeration compressor as set forth in claim 17 wherein said shield includes means to restrict rotational movement of said shield.]

[19. A refrigeration compressor as set forth in claim 18 wherein said second portion of said shield further includes means for limiting axial movement of said shield.]

[20. A refrigeration compressor as set forth in claim 19 wherein said shield is integrally formed from a polymeric composition.]

[21. A refrigeration compressor as set forth in claim 13 wherein said lower end portion of said rotor includes counterweight means associated therewith.]

[22. A scroll type refrigeration compressor comprising:

an outer shell;

compressor means disposed in an upper portion of said shell, said compressor means including first and second interleaved scroll members supported for relative orbital movement therebetween so as to define moving fluid pockets of changing volume;

motor means disposed within said shell below said compressor means and including a stator and a rotor;

a lubricant sump containing a supply of lubricant disposed in the lower portion of said shell;

a drive shaft drivingly connected to said compressor means and having a lower end extending into said sump, said rotor being secured to said drive shaft and operative to rotatably drive same;

a counterweight disposed within said sump below the normal non-operating upper limit of said lubricant, for counteracting the unbalanced forces resulting from the relative orbital movement of said first and second scroll members, said counterweight rotating with said shaft and said rotor; and hollow shield means enclosing an area surrounding said counterweight and extending above the normal upper level of said lubricant, said shield means being open at the upper end thereof;

said counterweight being operative to expel lubricant from said area enclosed by said shield means through said open upper end of said shield means during rotation thereof and said shield means being operative to restrict return flow of oil into said area whereby power consumption of said motor is reduced.]

*23. A refrigeration compressor comprising:*

*an outer shell;*

*a sump disposed in the bottom of said shell containing a supply of lubricant;*

*a compressor within said shell;*

*a motor disposed within said shell for driving said compressor, said motor including a stator and a rotor secured to a shaft drivingly connected to said compressor, the lower end of said rotor being rotatable and extending below the normal upper non-operating level of said lubricant in said sump, said shaft extending downwardly from the lower end of said rotor;*

*shield means including a first portion positioned adjacent the lower end of said rotor and extending generally radially outwardly from said shaft to a location between said rotor and stator and a second portion operative to position said first portion, said shield means being operative to restrict oil flow to the rotating lower end of said rotor whereby power consumption of said motor is reduced.*

*24. A refrigeration compressor as set forth in claim 23 wherein said shaft is rotatable relative to said shield means.*

*25. A refrigeration compressor as set forth in claim 24 wherein said shield further includes means for restricting rotational movement thereof.*

*26. A refrigeration compressor as set forth in claim 25 further comprising lower bearing means for rotatably supporting said shaft and wherein said rotation restricting means comprise a flange portion cooperating with said lower bearing means.*

*27. A refrigeration compressor as set forth in claim 23 further comprising lower bearing means for rotatably supporting said shaft and wherein said shield means is supported by said lower bearing means.*

*28. A refrigeration compressor as set forth in claim 27 wherein said shield means includes means for restricting rotational movement thereof.*

*29. A refrigeration compressor as set forth in claim 28 wherein rotational movement of said shield means is restricted by the viscous drag of said lubricant whereby said shaft rotates at a speed greater than said shield means.*

*30. A refrigeration compressor as set forth in claim 23 wherein said second portion cooperates with said shaft to position said first portion.*

*31. A refrigeration compressor as set forth in claim 23 wherein said second portion includes means limiting axial movement of said shield.*

*32. A refrigeration compressor as set forth in claim 23 wherein said second portion is positioned in closely spaced relationship with said shaft and cooperates therewith to position said first portion.*

*33. A refrigeration compressor as set forth in claim 23 wherein said shield also includes a third portion extending generally axially from the radially outer end of said first portion.*

*34. A refrigeration compressor comprising:*

*an outer shell;*

*a sump disposed in the bottom of said shell containing a supply of lubricant;*

*a compressor within said shell;*

*a motor disposed within said shell for driving said compressor, said motor including a stator and a rotor secured to a shaft drivingly connected to said compressor, the lower end of said rotor being rotatable and extending below the level of said lubricant in said sump, said shaft extending downwardly from the lower end of said rotor;*

*lower bearing means rotatably supporting said shaft; and*

*shield means positioned between said lower bearing means and the lower end of said rotor, said shield means including a first portion extending generally radially outwardly from said shaft in axially spaced relationship to said lower end to an area between said rotor and stator being operative to restrict oil flow to the rotating lower end of said rotor whereby power consumption of said motor is reduced.*

*35. A refrigeration compressor as set forth in claim 34 wherein said shaft is rotatable relative to said shield means.*

*36. A refrigeration compressor as set forth in claim 35 wherein said shield further includes means for restricting rotational movement thereof.*

*37. A refrigeration compressor as set forth in claim 36 wherein said rotation restricting means comprise a flange portion cooperating with said lower bearing means.*

*38. A refrigeration compressor as set forth in claim 35 wherein rotational movement of said shield means is restricted by the viscous drag of said lubricant whereby said shaft rotates at a speed greater than said shield means.*

*39. A refrigeration compressor as set forth in claim 34 wherein said shield means is supported by said lower bearing means.*

*40. A refrigeration compressor as set forth in claim 34 wherein said shield means includes a first portion position adjacent the lower end of said rotor and a second portion operative to position the first portion.*

*41. A refrigeration compressor as set forth in claim 40 wherein said second portion includes means limiting axial movement of said shield.*

*42. A refrigeration compressor as set forth in claim 41 wherein said second portion operates to maintain said first portion in spaced relationship to said rotor.*

*43. A refrigeration compressor as set forth in claim 42 wherein said second portion also positions said first portion in spaced relationship to said stator.*

*44. A refrigeration compressor as set forth in claim 34 wherein said shield also includes a third portion extending generally axially from the radially outer end of said first portion.*

* * * * *

UNITED STATES PATENT AND TRADEMARK OFFICE

CERTIFICATE OF CORRECTION

PATENT NO. : RE 37,019 E
DATED : January 16, 2001
INVENTOR(S) : John P. Elson

It is certified that error appears in the above-identified patent and that said Letters Patent is hereby corrected as shown below:

Column 8,
Line 9, "position" should be -- positioned --.

Signed and Sealed this

Thirtieth Day of April, 2002

*Attest:*

*Attesting Officer*

JAMES E. ROGAN
*Director of the United States Patent and Trademark Office*